(12) United States Patent
Jutzi

(10) Patent No.: US 7,275,254 B1
(45) Date of Patent: Sep. 25, 2007

(54) METHOD AND APPARATUS FOR DETERMINING AND DISPLAYING THE SERVICE LEVEL OF A DIGITAL TELEVISION BROADCAST SIGNAL

(75) Inventor: Curtis E. Jutzi, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 1120 days.

(21) Appl. No.: 09/717,579

(22) Filed: Nov. 21, 2000

(51) Int. Cl.
*H04N 7/20* (2006.01)

(52) U.S. Cl. .......................... 725/72; 725/70; 725/107; 348/180; 348/192

(58) Field of Classification Search .................. 725/72, 725/70, 140, 152, 107; 348/180, 184, 185, 348/192, 193, 553, 563, 569, 570, 731, 181; 455/3.2, 6.2, 6.3, 226.1, 226.2, 67.14, 115.2, 455/115.3, 115.4, 226.4; 370/252–253
See application file for complete search history.

(56) References Cited

U.S. PATENT DOCUMENTS

| 4,115,855 | A | 9/1978 | Chiba |
| 4,546,382 | A | 10/1985 | McKenna et al. |
| 4,566,030 | A | 1/1986 | Nickerson et al. |
| 4,602,279 | A | 7/1986 | Freeman |
| 4,624,578 | A | 11/1986 | Green |
| 4,646,145 | A | 2/1987 | Percy et al. |
| 4,695,879 | A | 9/1987 | Weinblatt |
| 5,075,771 | A | 12/1991 | Hashimoto |
| 5,155,591 | A | 10/1992 | Wachob |
| 5,175,836 | A | 12/1992 | Morgan |
| 5,227,874 | A | 7/1993 | Von Kohorn |
| 5,303,234 | A | 4/1994 | Kou |
| 5,357,276 | A | 10/1994 | Banker et al. |

(Continued)

FOREIGN PATENT DOCUMENTS

EP 0064168 11/1982

(Continued)

OTHER PUBLICATIONS

Barry G. Haskell, et al.; Digital Video: An Introduction to MPEG-2; 1997; pp. 280-283; Chapman & Hall; New York, NY.

(Continued)

*Primary Examiner*—Ngoc Vu
(74) *Attorney, Agent, or Firm*—Blakely, Sokoloff, Taylor & Zafman LLP

(57) ABSTRACT

The present invention provides a method, apparatus, and system for determining and displaying the service level of a digital television broadcast signal. A digital television receiver receives a digital television broadcast signal. The digital television broadcast signal includes a data test stream composed of a plurality of data packets. A service level determiner is used to determine a service level of the digital television broadcast signal based upon a loss of data packets from the data test stream (i.e. the error rate). The service level determiner additionally causes a representation of the service level to be displayed as a service level diagnostic indicator on a display device, such as a television. The service level diagnostic indicator can be updated at predetermined intervals to allow a user to place their antenna in a best service level position to receive the best service level as indicated by the service level diagnostic indicator.

18 Claims, 5 Drawing Sheets

U.S. PATENT DOCUMENTS

| | | |
|---|---|---|
| 5,388,211 A | 2/1995 | Hornbuckle |
| 5,392,223 A | 2/1995 | Caci |
| 5,408,465 A * | 4/1995 | Gusella et al. ............. 370/231 |
| 5,410,272 A | 4/1995 | Haberland et al. |
| 5,410,344 A | 4/1995 | Graves et al. |
| 5,426,513 A | 6/1995 | Scorse et al. |
| 5,444,499 A | 8/1995 | Saitoh |
| 5,446,919 A | 8/1995 | Wilkins |
| 5,457,808 A | 10/1995 | Osawa et al. |
| 5,483,278 A | 1/1996 | Strubbe et al. |
| 5,483,529 A | 1/1996 | Baggen et al. |
| 5,517,254 A | 5/1996 | Monta et al. |
| 5,530,082 A | 6/1996 | Friebe et al. |
| 5,530,965 A | 6/1996 | Kawasaki et al. |
| 5,534,911 A | 7/1996 | Levitan |
| 5,541,638 A | 7/1996 | Story |
| 5,544,161 A | 8/1996 | Bigham et al. |
| 5,550,928 A | 8/1996 | Lu et al. |
| 5,559,549 A | 9/1996 | Hendricks et al. |
| 5,563,895 A | 10/1996 | Malkamaki et al. |
| 5,564,088 A | 10/1996 | Saitoh |
| 5,566,174 A | 10/1996 | Sato et al. |
| 5,568,181 A | 10/1996 | Greenwood et al. |
| 5,574,509 A * | 11/1996 | Citta et al. ................. 348/569 |
| 5,583,561 A | 12/1996 | Baker et al. |
| 5,583,576 A | 12/1996 | Perlman et al. |
| 5,585,838 A | 12/1996 | Lawler et al. |
| 5,594,490 A | 1/1997 | Dawson et al. |
| 5,600,364 A | 2/1997 | Hendricks et al. |
| 5,600,573 A | 2/1997 | Hendricks et al. |
| 5,600,606 A | 2/1997 | Rao |
| 5,619,247 A | 4/1997 | Russo |
| 5,619,249 A | 4/1997 | Billock et al. |
| 5,648,824 A | 7/1997 | Dunn et al. |
| 5,652,870 A | 7/1997 | Yamasaki et al. |
| 5,654,747 A | 8/1997 | Ottesen et al. |
| 5,664,091 A | 9/1997 | Keen |
| 5,666,293 A | 9/1997 | Metz et al. |
| 5,680,322 A | 10/1997 | Shinoda |
| 5,686,954 A | 11/1997 | Yoshinobu et al. |
| 5,689,439 A | 11/1997 | Weerackody et al. |
| 5,701,599 A * | 12/1997 | Aihara .................... 455/186.1 |
| 5,717,923 A | 2/1998 | Dedrick |
| 5,724,345 A | 3/1998 | Guarneri et al. |
| 5,724,543 A | 3/1998 | Ozden et al. |
| 5,727,002 A | 3/1998 | Miller et al. |
| 5,732,282 A | 3/1998 | Provino et al. |
| 5,734,890 A | 3/1998 | Case et al. |
| 5,740,549 A | 4/1998 | Reilly et al. |
| 5,751,282 A | 5/1998 | Girard et al. |
| 5,752,160 A | 5/1998 | Dunn |
| 5,754,938 A | 5/1998 | Herz et al. |
| 5,758,257 A | 5/1998 | Herz et al. |
| 5,758,259 A | 5/1998 | Lawler |
| 5,768,681 A | 6/1998 | Dan et al. |
| 5,778,182 A | 7/1998 | Cathey et al. |
| 5,790,935 A | 8/1998 | Payton |
| 5,801,747 A | 9/1998 | Bedard |
| 5,801,753 A | 9/1998 | Eyer et al. |
| 5,815,662 A | 9/1998 | Ong |
| 5,838,668 A | 11/1998 | Okada et al. |
| 5,838,678 A | 11/1998 | Davis et al. |
| 5,842,199 A | 11/1998 | Miller et al. |
| 5,848,396 A | 12/1998 | Gerace |
| 5,867,226 A | 2/1999 | Wehmeyer et al. |
| 5,867,799 A | 2/1999 | Lang et al. |
| 5,897,608 A | 4/1999 | Yokoyama et al. |
| 5,903,314 A | 5/1999 | Niijima et al. |
| 5,905,713 A * | 5/1999 | Anderson et al. ........... 370/241 |
| 5,918,002 A | 6/1999 | Klemets et al. |
| 5,920,642 A | 7/1999 | Merjanian |
| 5,920,700 A | 7/1999 | Gordon et al. |
| 5,928,330 A | 7/1999 | Goetz et al. |
| 5,930,493 A | 7/1999 | Ottesen et al. |
| 5,937,411 A | 8/1999 | Becker |
| 5,940,073 A | 8/1999 | Klosterman et al. |
| 5,940,738 A | 8/1999 | Rao |
| 5,945,988 A | 8/1999 | Williams et al. |
| 5,963,551 A | 10/1999 | Minko |
| 5,973,683 A | 10/1999 | Cragun et al. |
| 5,974,398 A | 10/1999 | Hanson et al. |
| 5,977,964 A | 11/1999 | Williams et al. |
| 5,978,381 A | 11/1999 | Perlman et al. |
| 5,983,214 A | 11/1999 | Lang et al. |
| 5,991,735 A | 11/1999 | Gerace |
| 5,991,841 A | 11/1999 | Gafken et al. |
| 5,999,526 A | 12/1999 | Garland et al. |
| 5,999,908 A | 12/1999 | Abelow |
| 6,002,393 A | 12/1999 | Hite et al. |
| 6,002,852 A | 12/1999 | Birdwell et al. |
| 6,005,597 A | 12/1999 | Barrett et al. |
| 6,006,247 A | 12/1999 | Browning et al. |
| 6,012,051 A | 1/2000 | Sammon, Jr. |
| 6,018,359 A | 1/2000 | Kermode et al. |
| 6,018,768 A | 1/2000 | Ullman et al. |
| 6,020,883 A | 2/2000 | Herz et al. |
| 6,021,433 A | 2/2000 | Payne et al. |
| 6,025,868 A | 2/2000 | Russo |
| 6,028,685 A | 2/2000 | Caridi et al. |
| 6,029,045 A | 2/2000 | Picco et al. |
| 6,055,560 A | 4/2000 | Mills et al. |
| 6,057,872 A | 5/2000 | Candelore |
| 6,067,564 A | 5/2000 | Urakoshi et al. |
| 6,075,971 A | 6/2000 | Williams et al. |
| 6,085,252 A | 7/2000 | Zhu et al. |
| 6,085,253 A | 7/2000 | Blackwell et al. |
| 6,088,722 A | 7/2000 | Herz et al. |
| 6,108,645 A | 8/2000 | Eichstaedt et al. |
| 6,114,376 A | 9/2000 | Prichard et al. |
| 6,118,492 A | 9/2000 | Milnes |
| 6,119,189 A | 9/2000 | Gafken et al. |
| 6,125,259 A | 9/2000 | Perlman |
| 6,131,127 A | 10/2000 | Gafken et al. |
| 6,141,785 A | 10/2000 | Hur et al. |
| 6,144,376 A | 11/2000 | Connelly |
| 6,148,005 A | 11/2000 | Paul et al. |
| 6,160,989 A | 12/2000 | Hendricks et al. |
| 6,177,931 B1 | 1/2001 | Alexander et al. |
| 6,184,918 B1 | 2/2001 | Goldschmidt Iki et al. |
| 6,185,360 B1 | 2/2001 | Inoue et al. |
| 6,215,776 B1 | 4/2001 | Chao |
| 6,226,618 B1 | 5/2001 | Downs |
| 6,233,283 B1 | 5/2001 | Chiu et al. |
| 6,236,395 B1 | 5/2001 | Sezan et al. |
| 6,240,553 B1 | 5/2001 | Son et al. |
| 6,271,893 B1 | 8/2001 | Kawaguchi et al. |
| 6,289,012 B1 | 9/2001 | Harrington et al. |
| 6,289,510 B1 | 9/2001 | Nakajima |
| 6,298,482 B1 | 10/2001 | Seidman et al. |
| 6,304,578 B1 | 10/2001 | Fluss |
| 6,320,850 B1 | 11/2001 | Perahia et al. |
| 6,324,182 B1 | 11/2001 | Burns et al. |
| 6,324,338 B1 | 11/2001 | Wood et al. |
| 6,349,321 B1 | 2/2002 | Katayama |
| 6,357,028 B1 | 3/2002 | Zhu |
| 6,357,042 B2 | 3/2002 | Srinivasan et al. |
| 6,359,557 B2 | 3/2002 | Bilder |
| 6,359,571 B1 | 3/2002 | Endo et al. |
| 6,374,405 B1 | 4/2002 | Willard |
| 6,378,036 B2 | 4/2002 | Lerman et al. |
| 6,389,593 B1 | 5/2002 | Yamagishi |
| 6,397,387 B1 | 5/2002 | Rosin et al. |
| 6,424,625 B1 | 7/2002 | Larsson et al. |
| 6,434,747 B1 | 8/2002 | Khoo et al. |

| | | |
|---|---|---|
| 6,449,632 B1 | 9/2002 | David et al. |
| 6,449,654 B1 | 9/2002 | Blackwell et al. |
| 6,457,010 B1 | 9/2002 | Eldering et al. |
| 6,459,427 B1 * | 10/2002 | Mao et al. .................. 725/109 |
| 6,460,036 B1 | 10/2002 | Herz et al. |
| 6,463,585 B1 | 10/2002 | Hendricks et al. |
| 6,467,089 B1 | 10/2002 | Aust et al. |
| 6,477,704 B1 | 11/2002 | Cremia |
| 6,480,783 B1 | 11/2002 | Myr |
| 6,481,011 B1 | 11/2002 | Lemmons |
| 6,490,722 B1 | 12/2002 | Barton et al. |
| 6,513,014 B1 | 1/2003 | Walker et al. |
| 6,513,069 B1 | 1/2003 | Abato et al. |
| 6,515,964 B1 * | 2/2003 | Cheung et al. ............. 370/230 |
| 6,516,192 B1 | 2/2003 | Spaur et al. |
| 6,519,571 B1 | 2/2003 | Guheen et al. |
| 6,526,455 B1 | 2/2003 | Kamimura |
| 6,526,575 B1 | 2/2003 | McCoy et al. |
| 6,529,526 B1 | 3/2003 | Schneidewend |
| 6,530,082 B1 | 3/2003 | Del Sesto |
| 6,557,042 B1 | 4/2003 | He et al. |
| 6,563,515 B1 | 5/2003 | Reynolds et al. |
| 6,564,381 B1 | 5/2003 | Hodge et al. |
| 6,570,843 B1 | 5/2003 | Wolfgang |
| 6,571,389 B1 | 5/2003 | Spyker et al. |
| 6,574,518 B1 | 6/2003 | Lounsberry et al. |
| 6,577,599 B1 | 6/2003 | Gupta et al. |
| 6,578,199 B1 | 6/2003 | Tsou et al. |
| 6,580,452 B1 * | 6/2003 | Gangitano .................. 348/180 |
| 6,587,985 B1 | 7/2003 | Fukushima et al. |
| 6,594,682 B2 | 7/2003 | Peterson et al. |
| 6,601,234 B1 | 7/2003 | Bowman-Amuah |
| 6,601,237 B1 | 7/2003 | Ten Kate et al. |
| 6,611,842 B1 | 8/2003 | Brown |
| 6,614,987 B1 | 9/2003 | Ismail et al. |
| 6,637,029 B1 | 10/2003 | Eilat et al. |
| 6,642,939 B1 | 11/2003 | Vallone et al. |
| 6,643,322 B1 | 11/2003 | Varma et al. |
| 6,662,330 B1 | 12/2003 | Hershey |
| 6,668,246 B1 | 12/2003 | Yeung et al. |
| 6,678,890 B1 | 1/2004 | Cai |
| 6,681,393 B1 | 1/2004 | Bauminger |
| 6,700,893 B1 * | 3/2004 | Radha et al. ............. 370/412 |
| 6,704,929 B1 | 3/2004 | Ozer et al. |
| 6,715,004 B1 | 3/2004 | Grimsrud et al. |
| 6,718,551 B1 | 4/2004 | Swix et al. |
| 6,718,552 B1 | 4/2004 | Goode |
| 6,721,713 B1 | 4/2004 | Guheen et al. |
| 6,721,954 B1 | 4/2004 | Nickum |
| 6,751,401 B1 | 6/2004 | Arai et al. |
| 6,772,209 B1 | 8/2004 | Chernock et al. |
| 6,782,370 B1 | 8/2004 | Stack |
| 6,782,476 B1 | 8/2004 | Ishibashi |
| 6,792,412 B1 | 9/2004 | Sullivan et al. |
| 6,801,936 B1 | 10/2004 | Diwan |
| 6,850,559 B1 | 2/2005 | Driessen et al. |
| 6,865,746 B1 | 3/2005 | Herrington et al. |
| 6,883,176 B1 | 4/2005 | Grooters |
| 6,898,762 B2 | 5/2005 | Ellis et al. |
| 6,928,655 B1 | 8/2005 | Omoigui |
| 6,931,657 B1 | 8/2005 | Marsh |
| 6,934,964 B1 | 8/2005 | Schaffer et al. |
| 6,950,604 B1 | 9/2005 | Kato et al. |
| 6,973,662 B1 | 12/2005 | Sie et al. |
| 6,990,676 B1 | 1/2006 | Proehl et al. |
| 7,007,294 B1 | 2/2006 | Kurapati |
| 7,017,189 B1 | 3/2006 | DeMello et al. |
| 7,024,679 B1 | 4/2006 | Sie et al. |
| 7,024,681 B1 | 4/2006 | Fransman et al. |
| 7,035,871 B2 | 4/2006 | Hunt et al. |
| 7,051,352 B1 | 5/2006 | Schaffer |
| 7,055,168 B1 | 5/2006 | Errico et al. |
| 7,065,709 B2 | 6/2006 | Ellis et al. |
| 7,072,932 B1 | 7/2006 | Stahl |
| 7,096,486 B1 | 8/2006 | Ukai et al. |
| 7,167,895 B1 | 1/2007 | Connelly |
| 2001/0003828 A1 | 6/2001 | Peterson et al. |
| 2001/0012299 A1 | 8/2001 | Dahlen |
| 2001/0013127 A1 | 8/2001 | Tomita et al. |
| 2001/0047516 A1 | 11/2001 | Swain et al. |
| 2003/0056216 A1 | 3/2003 | Wugofski et al. |
| 2003/0103532 A1 | 6/2003 | Betram et al. |

FOREIGN PATENT DOCUMENTS

| | | |
|---|---|---|
| EP | 0902569 | 3/1999 |
| EP | 0905631 | 3/1999 |
| EP | 1028551 | 8/2000 |
| EP | 1043892 | 10/2000 |
| EP | 1089201 | 4/2001 |
| EP | 1089571 | 4/2001 |
| EP | 1089572 | 4/2001 |
| JP | 2001101190 | 4/2001 |
| JP | 20011011190 | 4/2001 |
| JP | 2001290727 | 10/2001 |
| JP | 2003032710 | 1/2003 |
| WO | WO09726729 | 7/1997 |
| WO | WO91/02311 | 2/1999 |
| WO | WO9102311 | 2/1999 |
| WO | WO9944159 | 9/1999 |
| WO | WO9965237 | 12/1999 |
| WO | WO0001149 | 1/2000 |
| WO | WO0040028 | 7/2000 |
| WO | WO0059204 | 10/2000 |
| WO | WO0064165 | 10/2000 |
| WO | WO0064168 | 10/2000 |
| WO | WO015449 | 3/2001 |
| WO | WO0115451 | 3/2001 |
| WO | WO0117195 | 3/2001 |
| WO | WO0137123 | 5/2001 |

OTHER PUBLICATIONS

U.S. Appl. No. 09/532034, filed Mar. 21, 2000, inventor Jay H. Connelly.
U.S. Appl. No. 09/533024, filed Mar. 22, 2000, inventor Jay H. Connelly.
U.S. Appl. No. 09/717579, filed Nov. 21, 2000, inventor Curtis E. Jutzi.
*U.S. Office Action*, U.S. Appl. No.: 09/823,566, (Oct. 23, 2006), 1-8.
*U.S. Office action*, U.S. Appl. No.: 10/044,544, (Oct. 18, 2006), 1-26.
*U.S. Office Action*, U.S. Appl. No.: 10/044,546, (Nov. 15, 2006), 1-23.
"Internet and Broadcast; the Key to Digital Convergence", *Intel. Developer UPDATE Magazine*, (May 2000), pgs. 1-3.
"PCT International Search Report", PCT/US01/43862, (Dec. 4, 2003), 1-4.
"PCT International Search Report", PCT/US02/17270, (Jun. 3, 2003), 1-4.
"PCT International Search Report", PCT/US02/17381, (Oct. 20, 2003), 1-6.
"PCT International Search Report", PCT/US02/17316, (Nov. 6, 2002), 1-8.
"PCT International Search Report", PCT/US02/29091, (Apr. 3, 2003), 1-5.
"PCT International Search Report", PCT/US02/29099, (Mar. 28, 2003), 1-7.
"PCT International Search Report", PCT/US03/00169, (Jun. 2, 2003), 1-7.
Advanced Television Systems Comm, "Program and System Information Protocol for Terrestrial Broadcast and Cable Revision A and Amendment No. 1", *Advanced Television Systems Committee* Doc. A/65A, Dec. 23, 1997, Rev. A Pages a-e and pp. 1-135, (May 31, 2000), pgs. a-e & 1-135.

Anonymous, ""Set-top box offer new possibilities for broadcaster"", *Proquest, Broadcast Engineering*, Overland Park. vol. 41, issue 7., (Jun. 6, 1999), Pgs. 1-2.

Blundon, William, "When Push comes to Shove", *Blundons Corner*, (Apr. 1999), pgs. 1-4.

Business Wire, "MessageMedia Launches Support View", (Nov. 18, 1999), 1-2.

CISCO.COM, "Internet Protocol (IP) Multicast Technology Overview", http://www.cisco.com/warp/ public/cc/pd/iosw/tech/ipmuov/htm, Whitepaper Cisco Systems, Inc. Posted Jun. 27, 2001. Retrieved on Jun. 29, 2001., Pgs. 1-16.

Datta, Anindya, et al., "Adaptive Broadcast Protocols to Support Power Conservant Retrieval by Mobile Users", *IEEE Explore*, (Apr. 7, 1997), Pgs. 1-12.

European Broadcasting Union, "Digital Video Broadcasting (DVB); Specifications for Service Information (SI) in DVB systems", *European Broadcasting Union ETSI* EN 300 468 V1.4.1 (2000-11), France Copyright 2000., Pgs. 1-83.

Foremski, Tom, "New digital technology is putting more choice in the hands of traditional TV audiences whi will increasingly be able to decide their own programme schedules", *Financial Times*, (Mar. 3, 1999), pgs. 1-5.

Fry, Andy, "Channelling digital choice", *Marketing , London*, (Sep. 24, 1998), Pgs. 1-5.

Gummalla, Ajay Chandra V., "An Access Protocol for a Wireless Home Network", *IEEE*, Wireless Communications and Networking Conference, Sep. 21, 1999, (1999), 1392-1396.

Hartwig, Stephan, et al., "Broadcasting and Processing of Program Guides for Digital TV", *SMPTE Journal, SMPTE, Inc., vol. 106, No. 10*, Scarsdale, NY, XP000668926, (Oct. 1997), 727-732.

Haubner, Dr. P., et al., "Netzdienste fur Multimediale Anwendungen CSCW-MBone", *Teleseminar: Multimedia Systeme - Technologies and Gestaltung WS 95/96*, XP002248684, (1996), 1-20.

Holfeder, Wieland, "Interactive Remote Recording and Playback of Multicast Videoconferences", XP002088645, (Sep. 10, 1997), 450-463.

Holsendolph, Ernest, "The TV that works Like a Genie in a Box a Coputer called TIVO acts Like a Brainy VCR. Even Fetching programs that it thinks you might like to watch", *COX News Service, Greenboro News Record*, Greensboro, NC, (Sep. 3, 1999), pgs. 1-4.

Hu, Qinglong, et al., "Power Conservative Multi-Attribute Queries on Data Broadcast", *IEEE*, Data Engineering, 16th International Conference, San Diego, Calif., (2000), 157-177.

Hwang, Ren-Hung, et al., "Scheduling Policies for an VOD System over CATV Networks", *IEEE*, Department of Computer Science & Information Engineering, (1997), 438-442.

Int'l Org. for Standardization, "Information Technology - Generic Coding of Moving Pictures and Associated Audio: Systems, Recommendation H.222.0, ISO/IEC 13818-1", *Int'l Org. for Standardization, Coding of Moving Pictures and Associated Audio*, N0801, XP002033056, (Nov. 13, 1994), 1-165.

INTEL, "Client Infrastructure for Internet-Based Data Services for Digital Services for Digital Television; Enabling A New Class of DTV Services", *INTEL: Intel Architecture*, (2000), pgs. 1-10.

INTEL, "Internet and Broadcast: The Key to Digital Convergence. Utilizing Digital Technology to Meet Audience Demand", *INTEL: Intel Architecture Labs*, (2000), pgs. 1-4.

INTEL.COM, "Enhanced Digital Broadcast", http://www.developer.intel.com/ial/home/digentertain/edb.htm., Retrieved on the internet on Aug. 21, 2001. IAL Digital Entertainment, pgs. 1-3.

Morgenstern, Steve, ""Digital Etc. the end of TV as we know it"", *Proquest, Rolling Stone*. New York, Issue 818, (Aug. 5, 1999), pgs. 1-2.

REPLAYTV.COM, "Competitive Differences Replay TV Rules Here's Why . . . ", www.replaytv.com/overview/differences.htm, (Mar. 21, 2000), pgs. 1-2.

REPLAYTV.COM, "Features Your Time, Your Schedule", www.replaytv.com.overview/features/htm., Retrieved on Mar. 21, 2000., pgs. 1-2.

REPLAYTV.COM, "Frequently Asked Questions. Will Replay TV make me more popular? And other frequently asked questions.", www.replaytv.com/overview/faqs.htm, retrieved on Mar. 21, 2001, pgs. 1-4.

REPLAYTV.COM, "ReplayTV: Features/Benefits", www.replaytv.com/overview/details.htm., Retrieved on Mar. 21, 2000., pgs. 1-3.

REPLAYTV.COM, "Technical Specifications", www.replaytv.com/overview/techspecs.htm., Retrieved on Mar. 21, 2000., pg. 1.

REPLAYTV.COM, "What is ReplayTV? Introducing the new ReplayTV 2020", www.replaytv.com/overview/index.htm., Retrieved on Mar. 21, 2000., pg. 1.

Rosenberg, Jerry, "Dictionary of Computers, information processing & telecommunications", 2nd edition, (1987), p. 65.

Smyth, B, et al., "A Personalized Television Listings Service", *Communications of the ACM*, vol. 43, No. 8, (Aug. 2000), pgs. 107-111.

TIVO.COM, "Channel SURF in a whole new way", http://www.tivo.com/intro4/html, [retrieved on Mar. 21, 2000], pg. 1.

TIVO.COM, "Control Live TV", http://www.tivo.com/what/intro2/html, [retrieved on Mar 21, 2000], pg. 1.

TIVO.COM, "Digital Recordings without the Tape", http://www.tivo.com/what/intro5/html, [retrieved on Mar. 21, 2000], pg. 1.

TIVO.COM, "Frequently Asked Questions", http://www.tivo.com/what/faq_sub.html., Retrieved on Mar. 21, 2000., pgs. 1-9.

TIVO.COM, "PRODUCT Specifications", http://www.tivo.com/what/how2html, [retrieved on Mar. 21, 2000], pg. 1.

TIVO.COM, "Something Good Is Always On", http://www.tivo.com/what/intro3/html., Retrieved on Mar. 21, 2000., pg. 1.

TIVO.COM, "What is TiVo? Introduction to TiVo. Something GOOD is Always On", http://www.tivo.com/what/intro3.html, (Mar. 21, 2000), 1.

TIVO.COM, "What is TiVo? Introduction to TiVo. A Better Way to WATCH TV", http://www.tivo.com/what/intro/html, Retrieved on Mar. 21, 2000., pg. 1.

TIVO.COM, "What you want, When you want it", http://www.tivo.com/what/how/html., Retrieved on Mar. 21, 2000., pg. 1.

Wittig, Hartmut, et al., "Intelligent Media Agents in Interactive Television Systems", *IEEE*, Proceedings of the Int'l Conf. on Multimedia Computing and Systems, Los Angeles, CA XP000603484, (May 15, 1995), 182-189.

Wolinsky, Howard, "Hard Drive toward personalized TV // New computer devices search logs, then record", *Proquest, Chicago Sun - Times*, Chicago, Ill., (Jan. 19, 1999), pgs. 1-3.

Wong, Tina, "Multicast Push Service for Web Content", CS294-6 Internet Service Project Report, (Aug. 26, 2004), pgs. 1-4.

\* cited by examiner

METHOD AND APPARATUS FOR DETERMINING AND DISPLAYING THE SERVICE LEVEL OF A DIGITAL TELEVISION BROADCAST SIGNAL

BACKGROUND

1. Field of the Invention

This invention relates to communication systems. In particular, the invention relates to determining and displaying the service level of a digital television broadcast signal.

2. Description of Related Art

Digital Television ("DTV") is a broadcast technology that will transform television, as we now know it. Particularly, DTV is a new "over-the-air" digital television system that will be used by the nearly 1600 local broadcast television stations in the United States. The DTV standard is based on the Advanced Television System Committee (ATSC) Digital Television Standard A/53 (ATSC Doc. A/53, Sep. 6, 1995). With DTV, television pictures, sound, and new data services will be transmitted digitally, rather than as an analog signal. The increased capabilities and new services of DTV are made possible through the use of digital compression techniques that allow more information to be transmitted in the same amount of spectrum used by an existing television channel. The data rate of the DTV signal within the standard 6 MHz broadcast television channel is 19.44 Mbps. This allows for the transmission of programs with very high resolution and sound quality, much better than currently available analog broadcast technology, allowing for movie-quality picture and CD-quality sound and a variety of other enhancements. For example, DTV permits transmission of television programming in new wide screen, high resolution formats known as high definition television (HDTV). In addition, the new DTV television system allows transmissions in standard definition television (SDTV) formats that provide picture resolution similar to existing television service. Not only will broadcasters be able to broadcast at least one high definition HDTV program, they may also simultaneously transmit SDTV programs using a single television channel.

The DTV system also makes possible the delivery of digital data services to a television and/or computer alone, or simultaneously with, television and audio programming. Of particular interest, beyond the transmission of audio/visual (A/V) information (i.e. the television program), is that these digital broadcast signals from the television networks include additional data that may carry any number of valuable assets. Particularly, the data portion of the digital broadcast signal may carry Advanced Television Enhancement Forum (ATVEF) content (e.g. graphics, video, text, audio, and other types of data) and Streaming Internet Protocol (IP) data (e.g. graphics, video, text, audio, and other types of data). Using this data transmission capability, it will be possible for broadcast stations to send additional data content such as publications (e.g. a local "electronic newspaper"), news, music, program schedules, computer software, or virtually any other type of information/data, at the same time that they transmit regular television programming or in lieu of television programming.

For example, a television network may transmit a financial news show (i.e. the A/V information from the digital broadcast signal) with an announcer talking about what happened to the stock market during the day, simultaneously, the broadcast station can transmit digital data (e.g. graphics, video, text, audio, and other types of data), such as streaming stock quotes, information about a company—e.g. a news story or a picture of the company headquarters, graphs, cartoons, or virtually any type of information, for example, in a window under the announcer. The DTV system also provides the flexibility to support the introduction of new services in the future, as technology and viewer interests continue to develop.

For the compression of video signals, the ATSC DTV Standard requires conformance with the main profile syntax of the Moving Pictures Experts Group (MPEG)-2 video standard. Employing this standard, the amount of data needed to represent television pictures is reduced using a variety of tools, including a motion compensated discrete cosine transform (DCT) algorithm and bi-directional-frame (B-frame) prediction. For the compression of audio signals, conformance with the ATSC DTV Standard A/52 (ATSC Doc.A/52, Dec. 20, 1995) is required, which specifies the Digital Audio Compression (AC-3) Standard. The AC-3 perceptual coding system, which was developed by Dolby Labs, can encode a complete main audio service which includes left, center, right, left surround, right surround, and low frequency enhancement channels into a bit stream at a rate of 384 kilobits per second (kbps).

The service multiplex and transport layer of the ATSC DTV Standard is a compatible subset of the MPEG-2 systems standard that describes a means of delivering a digital data stream in fixed-length "packets" of information. Each packet contains only one type of data: video, audio or ancillary (e.g. data). There is no fixed mix of packet types, which further helps provide flexibility. Channel capacity can be dynamically allocated in the transport layer, under the direct control of the broadcaster. The ATSC DTV Standard has been optimized for terrestrial digital television delivery, where channel bandwidth is limited and transmission errors and data loss are likely. Within the transport layer, the packets of video, audio, closed captioning and any other data associated with a single digital television program are combined using a mechanism to ensure that the sound, pictures and closed captioning information can be synchronized at the receiver. Data describing multiple television programs (e.g. program guide information), or unrelated data for other purposes, are also combined in the transport layer.

A problem with Digital Television (DTV) is that present methods to accurately tune a digital receiver, by determining the best position of the antenna (indoor or outdoor), to receive the "best service level" of a DTV broadcast signal are inadequate. The "best service level" corresponds to the digital receiver receiving the greatest amount of the actual data packets (video, audio, or data) contained within the digital broadcast signal, as possible.

For example, a user can attempt to utilize a video component of the digital broadcast signal to determine the "best service level", but this is very imprecise. Under this scenario, a user when trying to find the best reception for a certain channel, will tune to a channel and adjust their antenna (indoor or outdoor) until what they believe is the "best" video is displayed. The user may adjust their antenna in one direction and find that the video becomes blocky or chunky (indicating missing data packets) and then turn the antenna in the other direction and the video appears to more complete. However, there is no way for the user to be objectively sure that they are indeed getting the "best service level" (i.e. that the greatest amount of data packets of the digital broadcast signal are actually being received) for the best video picture possible. A user could try to tune an antenna based purely on an audio component but this is even more complicated and problematic than the video case.

Moreover, if a viewer wants to obtain a pure data broadcast that has no visual or audio component to use for adjusting their antenna, it is virtually impossible for the user to determine the "best service level", or any sort of service level, to ensure that they are actually receiving the data packets of the digital broadcast signal. Unfortunately, presently, users do not have adequate ways to be objectively sure that they are indeed getting the "best service level" such that they are receiving the greatest amount of data packets of the digital broadcast signal as possible.

Some solutions to determine the degree of service level have been previously utilized with satellite broadcasts. These solutions include using "Signal Strength" and Signal/Noise (Carrier/Noise) ratios. For example, most satellite receivers use "Signal Strength" to identify the best antenna position. However, just because the best signal is found, this does not necessarily mean that the "best service level" has been found. Particularly, although these two solutions may provide an adequate indicator of service level, these solutions are problematic in that neither multi-path interference or other interference patterns can be detected utilizing these solutions. For example, many multi-path interference issues arise with satellite transmissions that utilize 8 VSB (vestigial sideband) and COFDM (Coded Orthogonal Frequency Division Multiplexing) standards. Moreover, these two solutions are only indicators of what the actual data packet error rate (i.e. the data packet loss over time) is. They only measure signal strength and not true transport quality. Accordingly, they do not directly measure the actual data packet error rate and thus the "true" service level.

BRIEF DESCRIPTION OF THE DRAWINGS

The features and advantages of the present invention will become apparent from the following description of the present invention in which.

DESCRIPTION

Figure 1:
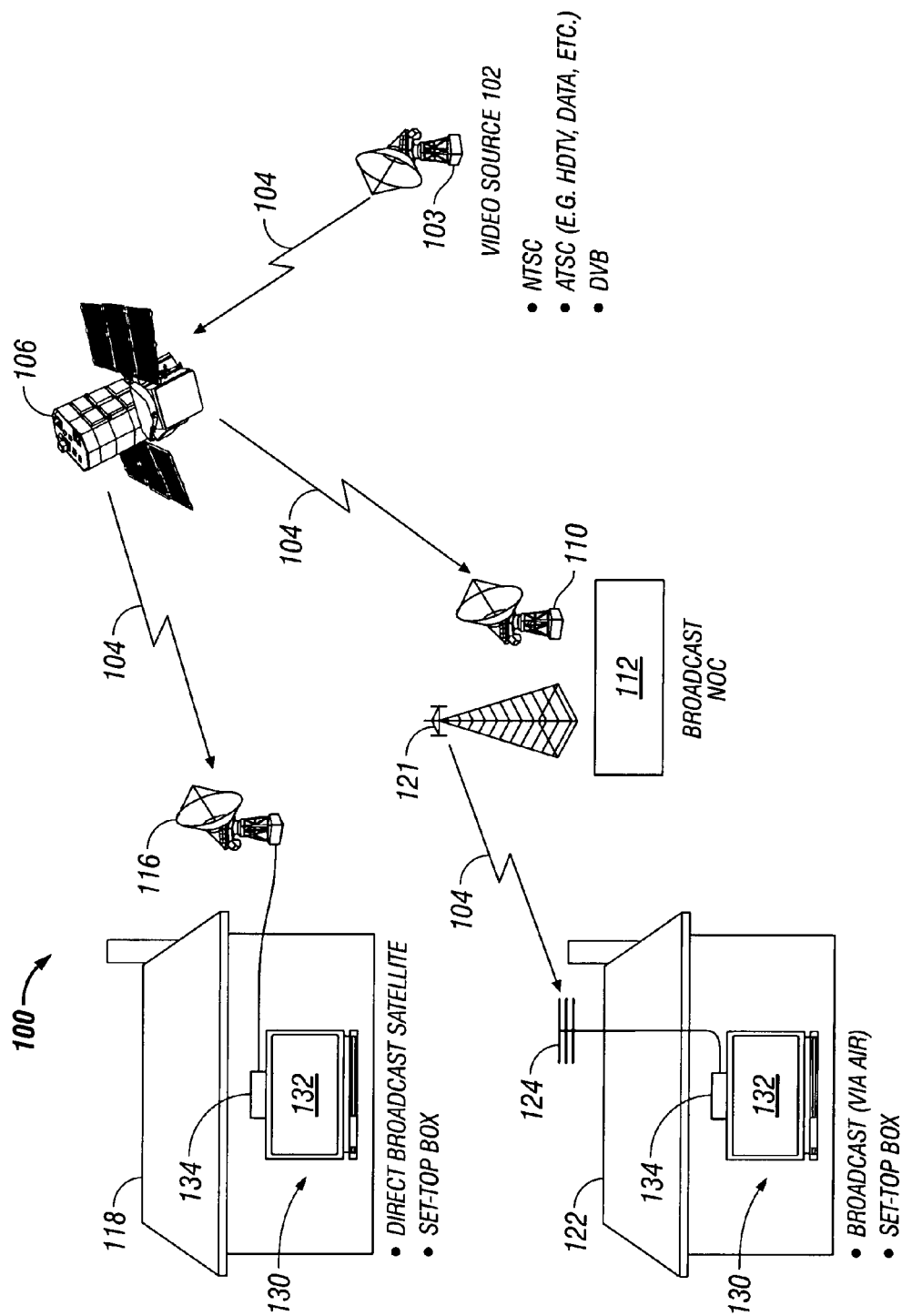
FIG. 1 is a block diagram illustrating an exemplary environment in which an embodiment of the invention can be practiced.

The present invention provides a method, apparatus, and system for determining and displaying the service level of a digital television (DTV) broadcast signal. Particularly, in one embodiment of the invention, a digital television receiver receives a digital television broadcast signal. The digital television broadcast signal can include data packets containing video, audio and other data components. Also, the digital television broadcast signal includes a data test stream composed of a plurality of data packets. A service level determiner is used to determine a service level of the digital television broadcast signal based upon a loss of data packets from the data test stream. The service level determiner additionally causes a representation of the service level to be displayed.

In one embodiment of the present invention, the data test stream can be an Internet Protocol (IP) based data test stream locatable on a given Packet Identifier (PID) of the digital broadcast signal, in which, the IP based data test stream includes sequentially numbered packets. Also, in some embodiments, the IP data test stream can have a fixed IP address allowing any digital television receiver capable of receiving IP data test streams to acquire and process it. The service level determiner determines a data packet loss percentage value for the data test stream by calculating the ratio of the measured number of data packets received by the digital receiver and the number of data packets that should have been received by the digital receiver. This can occur over a predetermined interval of time or number of packets. The service level determiner maps the data packet loss percentage value of the data test stream into a service level diagnostic that can be displayed on a display device, such as a television, as a service level diagnostic indicator, to indicate the service level of the digital television broadcast signal. The displayed service level diagnostic indicator can be updated at predetermined intervals (e.g. time or number of packets) to allow a user to place their antenna in a best service level position to receive the "best service level" as indicated by the service level diagnostic indicator. The "best service level" corresponds to the digital receiver receiving the greatest amount of the data test stream contained within the digital television broadcast signal as possible. The service level determiner can be used for digital television broadcast signals communicated from either a terrestrial broadcast station or communicated via a satellite network, as well as, by other types of communication media.

The present invention provides an advantage in that it provides an objective measure for the user to be sure that they are indeed getting the "best service level" (i.e. that the greatest amount of data packets of the data test stream of the digital television broadcast signal are actually being received) to ensure that the user obtains the best delivery of video, audio, or other data components possible from the digital television broadcast signal. Additionally, if a viewer wants to obtain a pure data broadcast that has no visual or audio component to use for adjusting their antenna, the present invention provides an objective measure to tune their antenna to receive the "best service level" for receiving the greatest number of data packets of the pure data broadcast.

Furthermore, because the present invention directly measures the actual data packet loss (i.e. the error rate) of the data test stream a "true" service level is displayed to the user. The present invention accomplishes this with a very simple and elegant solution by directly measuring the data packet error rate of an IP data test stream. Accordingly, DTV Broadcasters can simply provide an IP data test stream in their broadcast to easily allow users to adjust their antennas to receive a digital broadcast having the "best service level" possible. Also, this solution enables IP data to be sent to users in all ATSC/DTV markets and could possibly accelerate the deployment of free data broadcasting to metropolitan areas of the U.S. and all over the world.

In the following description, the various embodiments of the present invention will be described in detail. However, such details are included to facilitate understanding of the invention and to describe exemplary embodiments for implementing the invention. Such details should not be used to limit the invention to the particular embodiments described because other variations and embodiments are possible while staying within the scope of the invention. Furthermore, although numerous details are set forth in order to provide a thorough understanding of the present invention, it will be apparent to one skilled in the art that these specific details are not required in order to practice the present invention. In other instances details such as, well-known electrical structures and circuits, are shown in block diagram form in order not to obscure the present invention.

FIG. 1 is a block diagram illustrating an exemplary environment 100 in which an embodiment of the invention can be practiced. As shown in FIG. 1, a video source 102 (e.g. a television network such as NBC) having a satellite transmitter 103 transmits a digital television broadcast signal 104 to a satellite 106 that in turn relays the digital television broadcast signal 104 to a satellite antenna 110 of a ground based Broadcast Network Operating Center (NOC) 112 or to a satellite antenna 116 of a house 118 that is equipped to receive direct broadcast satellite transmissions (e.g. Digital Video Broadcasting (DVB), DirectTV, etc.). Typically, a Broadcast NOC 112 aggregates and transmits the network's digital television broadcast signal 104 via a transmitter 121 to a house 122 having an antenna 124 for receipt of the digital television broadcast signal 104. In either case, direct satellite transmission or terrestrial broadcast, the digital television broadcast signal 104 is received by a receiver device 130 having a display device, typically a television 132 having a set-top box 134 to decode the digital television broadcast signal. Alternatively, the receiver device 130 could be a computer with a computer monitor. The digital television broadcast signal 104 includes audio and video (A/V) information (e.g. a television program), as well as, pure data components. Many television networks digitally broadcast their television programs in new wide screen high definition television HDTV formats, as well as, in standard definition television SDTV formats.

Most television networks broadcast their digital television broadcast signal 104 from a video source 102 utilizing the MPEG-2 transport format that delivers a digital data stream in fixed-length "packets" of information. Each packet contains only one type of data: video, audio or ancillary (e.g. data). Particularly, many television networks transmit their digital television broadcast signals in accordance with Digital Video Broadcasting (DVB) standards set by the European Telecommunications Standards Institute or the Advanced Television System Committee (ATSC) standards (e.g. ATSC Modulation and Coding Requirements for Digital TV (DTV) Applications over Satellite A/80 standard (ATSC Doc. A/80, Jul. 17, 1999)). The DVB standard specifies the MPEG-2 format for video, audio, and transport. The ATSC standard specifies the MPEG-2 format for video, the Digital Audio Compression (AC-3) Standard for audio, and identifies the MPEG-2 format as a means of transport, but it is not limited to this format. Additionally, television networks also broadcast analog television broadcast signals from a video source 102 conforming to the National Television Standards Committee (NTSC) standard.

Terrestrial Digital TV (DTV) Broadcast Network Operating Centers (NOC) 112 conforms to the standards set forth in the Advanced Television System Committee (ATSC) Digital Television Standard A/53 (ATSC Doc. A/53, Sep. 16, 1995) for transmitting the digital television broadcast signal 104. For the compression of video signals, the ATSC DTV Standard requires conformance with the main profile syntax of the Moving Pictures Experts Group (MPEG)-2 video standard. For the compression of audio signals, conformance with the ATSC DTV Standard A/52 (ATSC Doc.A/52, Dec. 20, 1995) is required, which specifies the Digital Audio Compression (AC-3) Standard.

Digital Television (DTV) also makes possible the delivery of digital data services to a television and/or computer alone, or simultaneously with, television and audio programming. Of particular interest, beyond the transmission of audio/visual (A/V) information (i.e. the television program), is that these digital broadcast signals from the television networks include additional data that may carry any number of valuable assets. Particularly, the data portion of the digital broadcast signal may carry Advanced Television Enhancement Forum (ATVEF) content (e.g. graphics, video, text, audio, and other types of data) and Streaming Internet Protocol (IP) data (e.g. graphics, video, text, audio, and other types of data). Using this data transmission capability, it will be possible for broadcast stations to send additional data content such as publications (e.g. a local "electronic newspaper"), news, music, program schedules, computer software, or virtually any other type of information/data, at the same time that they transmit regular television programming or in lieu of television programming. For example, a television network may transmit a financial news show (i.e. the A/V information from the digital broadcast signal) with an announcer talking about what happened to the stock market during the day, simultaneously, the broadcast station can transmit digital data (e.g. graphics, video, text, audio, and other types of data), such as streaming stock quotes, information about a company—e.g. a news story or a picture of the company headquarters, graphs, cartoons, or virtually any type of information, for example, in a window under the announcer. The DTV system also provides the flexibility to support the introduction of new services in the future, as technology and viewer interests continue to develop.

A current problem with Digital Television (DTV) is that present methods to accurately tune a digital receiver, by determining the best position of the antenna (indoor or outdoor), to receive the "best service level" of a DTV broadcast signal are inadequate. The "best service level" corresponds to the digital receiver receiving the greatest amount of the actual data packets (video, audio, or data) contained within the digital broadcast signal as possible. Fortunately, the present invention provides a method, apparatus, and system for determining and displaying the "best service level" of a digital television (DTV) broadcast signal. Particularly, the present invention includes a service level determiner to determine a service level of the digital television broadcast signal based upon a loss of data packets (i.e. error rate) from the data test stream and additionally causes a representation of the service level to be displayed.

Figure 2:
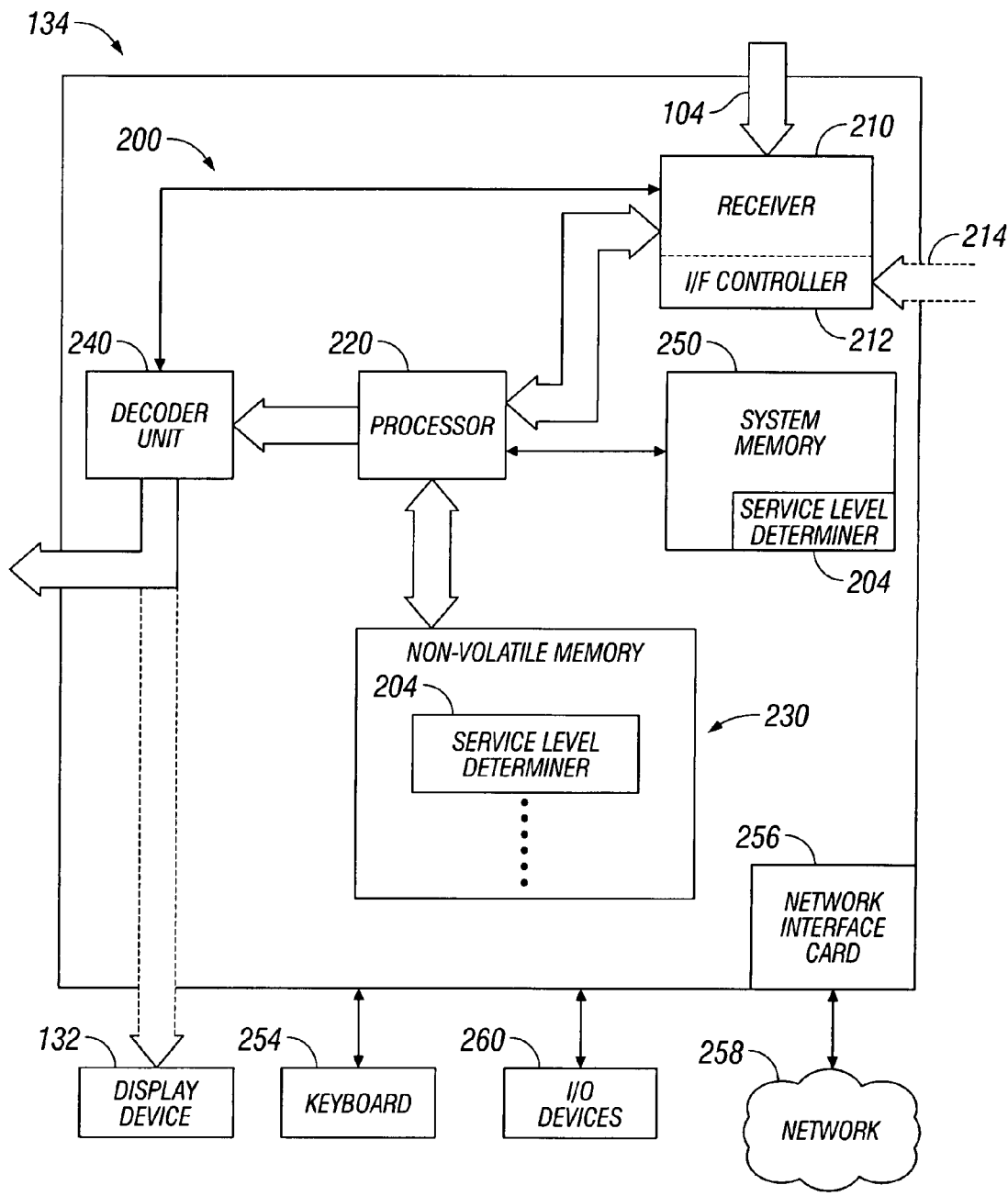
FIG. 2 is a block diagram of certain internal components elements of an exemplary set-top box environment in which one embodiment of the present invention including a service level determiner can be implemented.

FIG. 2 shows a block diagram of certain internal components elements 200 of an exemplary set-top box 134 environment in which one embodiment of the present invention including a service level determiner 204 can be implemented. The internal elements 200 include a digital television receiver 210, a processor 220, a non-volatile memory 230, a decoder unit 240, and a system memory 250. The set-top box 134 implementing the service level determiner 204 can be used to determine a service level of an incoming digital television broadcast signal 104 based upon a loss of data packets (i.e. error rate) from a data test stream. Further, the exemplary set-top box 134 implementing the service level determiner 204 can be used to display a service level diagnostic indicator representative of the service level of the digital broadcast signal 104 to be displayed upon a display device 132, such as a television. Also, additional elements that may be used with the set-top box 134 will be discussed. Furthermore, it is contemplated that set-top box 134 implementing the service level determiner 204 may employ other elements but these elements are not shown in order to avoid obscuring the invention.

Herein, the digital television receiver 210 receives the digital television broadcast signal 104. The digital television broadcast signal 104 can include data packets containing video, audio and other data components. Also, the digital television broadcast signal includes a data test stream composed of a plurality of data packets. In one embodiment of the present invention, the data test stream can be an Internet Protocol (IP) based data test stream locatable on a given Packet Identifier (PID) of the digital broadcast signal, in which, the IP based data test stream includes sequentially numbered packets. The digital television receiver 210 includes a tuner that extracts the incoming content of the digital television broadcast signal 104 for a particular channel. Moreover, the digital television receiver 210 may support requests that certain segments of content from the digital television broadcast signal 104 be displayed. Additionally, the digital television receiver 210 may include an interface (I/F) controller 212 to detect signals 214 (e.g., IR signals) from a remote control unit commanding it to tune to a certain channel or to perform other functions. As shown, the digital television receiver 210 is coupled to the processor 220.

The processor 220 is a logic unit for processing information for the set-top box 134. Particularly, the processor 220 processes information in order to implement the functions of the service level determiner 204, such as, to determine a service level of the digital television broadcast signal based upon a loss of data packets (i.e. error rate) from the data test stream and to additionally cause a representation of the service level to be displayed. Moreover, the processor 220 processes information in order to implement all the other functions of the service level determiner and the other functions of the invention, as will be discussed in detail later, as well as, the many other functions of the set-top box 134. As illustrative examples, the "processor" may include a digital signal processor, a microcontroller, a state machine, or even a central processing unit having any type of architecture, such as complex instruction set computers (CISC), reduced instruction set computers (RISC), very long instruction word (VLIW), or hybrid architecture. In this embodiment, the processor 220 is shown as a single logic unit; however, it is contemplated that the processor 220 may be at least two or more processors operating as a collective unit. As shown, the processor 220 is coupled to non-volatile memory 230, the decoder unit 240, and system memory 250.

The non-volatile memory 230 features any memory that can retain its contents when the set-top box 134 is powered down. Examples of the non-volatile memory include a hard disk, flash memory, battery-backed random access memory, Read-only-Memory (ROM) and the like. Particularly, in one embodiment of the invention, the instructions/code segments to implement the various functions of the service level determiner 204, as will be discussed, can be stored in the non-volatile memory 230.

The decoder unit 240 is logic that decodes incoming content—e.g. the incoming digital television broadcast signals 104. As previously discussed, the digital television broadcast signals 104 are placed in an encoded (or compressed) format prior to transmission from the content providers—e.g. the television networks. Examples of the compressed format include a Motion Picture Experts Group format such as MPEG-2. The decoder unit 240 is further configured to convert the content to an appropriate display format such as National Television System Committee (NTSC) Standard of the Electronics Industries Association. Particularly, the decoder unit 240 can decode the video, audio, or other data components of the digital television broadcast signal 104 for display and/or processing by the processor 220. Moreover, the decoder unit can decode the data test stream of the digital broadcast signal to be used by the processor 220 and the service level determiner 204 to determine a service level of the digital television broadcast signal. Output from the decoder unit 240 can also be used for other functions. Of course, it is contemplated that the content may be routed through the decoder unit 240 without undergoing any operations if the content is not placed in an encoded format.

System memory 250 is a device that is adapted to store digital information. The system memory 250 can be used to store system code, data, programs—such as an operating system for the set-top box 134, and can be used in implementing the service level determiner 204 of the present invention. The system memory 140 can be implemented with random access memory (RAM), dynamic random access memory (DRAM) or static random access memory (SRAM), etc. or any combination thereof, or any other type of memory.

The set-top box 134 may also include numerous other elements. For example, set-top box 134 may include a keyboard 254 for the input of data from a user. The set-top box 134 may include a network interface card 256 to bi-directionally couple the set-top box to a computer network 258 such as the Internet. Furthermore, the set-top box 134 may include a plurality of other Input/Output devices 260 to perform I/O functions. The I/O devices 160 can include a monitor, a modem, a printer, or any other types of I/O devices, e.g., controllers for input devices (mouse, trackball, pointing device), media cards (e.g., audio, video, graphics), other network cards, other peripheral controllers, a hard disk, a floppy drive, an optical digital storage device, a magneto-electrical storage device, DVD, CD-ROM, etc., or any combination thereof.

The exemplary set-top box 134 of FIG. 2 is only an example of environment that the service level determiner 204 according to one embodiment of the invention can be practiced with. It should be appreciated the present invention can be practiced with any sort of set-top box, can be implemented purely in hardware such as a hardware card (e.g. useable with a set-top box, a television, a receiver, a computer, etc.), can be implemented with any sort of computing device such as: a personal computer, server computer, workstation, minicomputer, laptop, desktop, hand held computing device, palm pilot, etc., or basically any sort of device that includes circuitry capable of processing data. In particular, in one embodiment of the present invention, the service level determiner 204 can be generally implemented in a set-top box having a processor, as one or more instructions (e.g. code segments), to perform the desired functions. The instructions which when read and executed by a processor, cause the processor to perform the operations necessary to implement and/or use the present invention. Generally, the instructions are tangibly embodied in and/or readable from a machine-readable medium, device, or carrier such as memory, data storage devices, and/or a remote device coupled to the set-top box via data communication devices. The instructions may be loaded from memory, data storage devices, and/or remote devices into the memory of the set-top box for use during operations.

Those skilled in the art will recognize that the exemplary environments illustrated in FIGS. 1 in 2 are not intended to limit the present invention. Indeed, those skilled in the art will recognize that other alternative system environments may be used without departing from the scope of the present invention.

Various methods, processes, procedures and/or algorithms will now be discussed to implement certain aspects of the invention.

Figure 3:
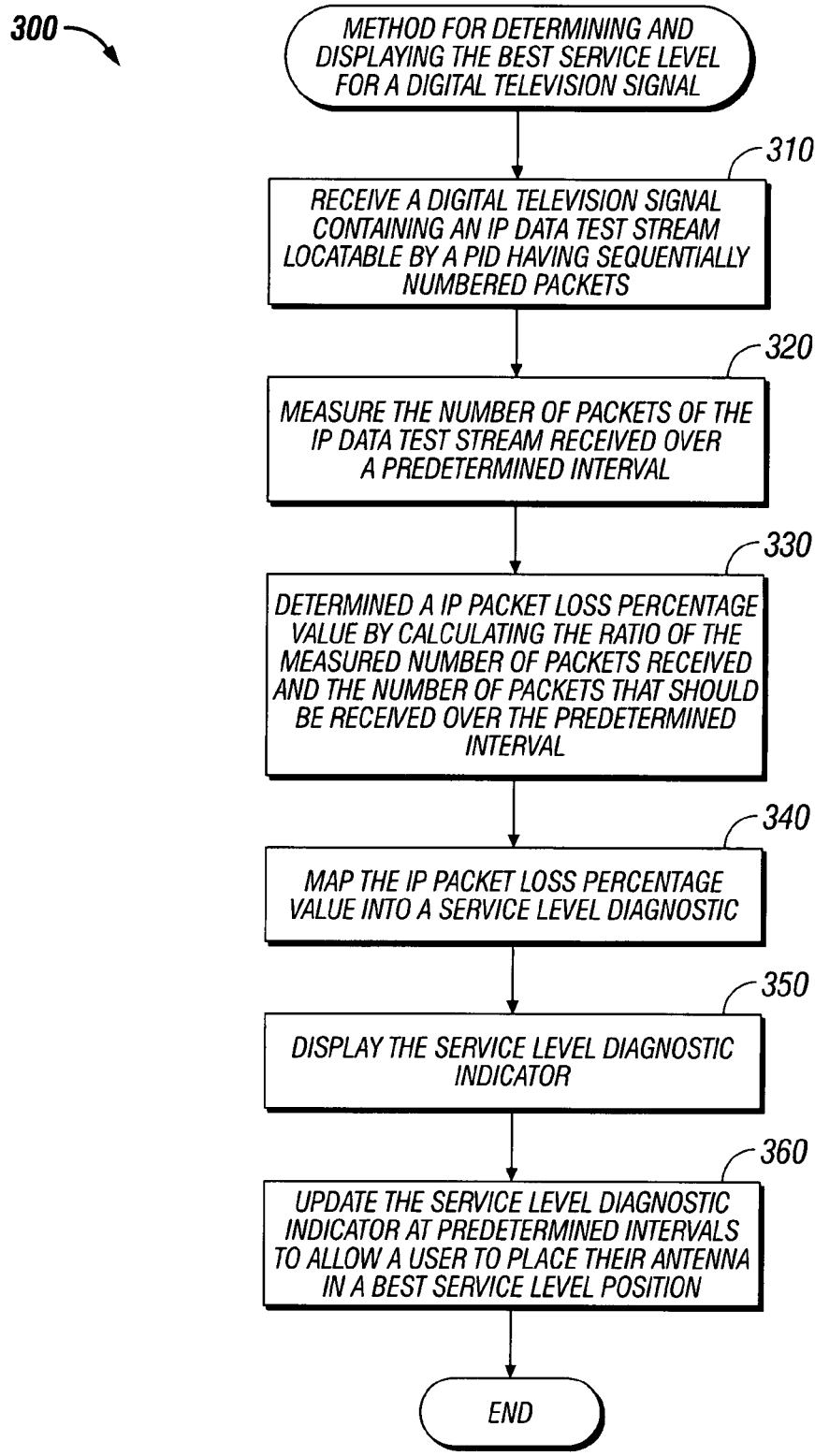
FIG. 3 is a flowchart illustrating a process for determining and displaying the "best service level" for a digital television broadcast signal according to one embodiment of the present invention.

FIG. 3 is a flowchart illustrating a process 300 for determining and displaying the "best service level" for a digital television broadcast signal according to one embodiment of the present invention. First, the process 300 receives a digital television broadcast signal (block 310). As previously discussed, the digital television broadcast signals may conform to Advance Television System Committee (ATSC) standards for terrestrial digital television broadcasts or Digital Video Broadcasting (DVB) standards for direct satellite transmissions, both of which utilize MPEG-2 transport formats to deliver a digital stream in fixed-length packets of information. Each packet contains only one type of data: a video, audio or ancillary (e.g. data). However, it should be appreciated, that digital television broadcast signals may conform to other types of standards. Moreover, the digital television broadcast signal can include a data test stream composed of a plurality of data packets.

In one embodiment of the invention, the data test stream can be an Internet Protocol (IP) based data test stream locatable on a given Packet Identifier (PID) of the digital broadcast signal having sequentially numbered packets. (Block 310). For example, ATSC Program and System Information Protocol (PSIP) for Terrestrial Broadcast and Cable A/65 (ATSC Doc. A/65, Dec. 23, 1997) defines a Standard for System Information (SI) and Program Guide (PG) data compatible with digital multiplex bit streams constructed in accordance with MPEG-2. Particularly, it provides a standardized format for transmitting data about current and future programs using private data sections in the transport stream that can be acquired and processed by suitably equipped digital receivers.

Figure 4:
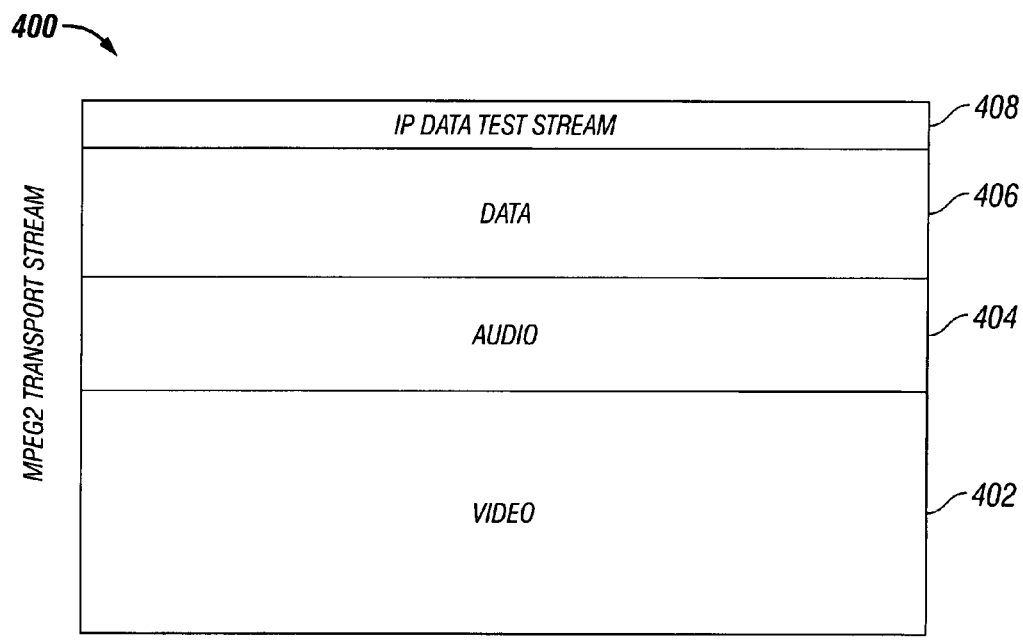
FIG. 4 illustrates an example of an MPEG-2 transport stream having an IP data test stream component according to one embodiment of the present invention.

Continuing with the current example, in one embodiment of the invention, the data test stream can be located on a given PID which can be identified using the PSIP data of the MPEG2 digital broadcast stream from a particular station. FIG. 4 illustrates an example of an MPEG-2 transport stream 400 having an IP data test stream component according to one embodiment of the present invention. Particularly, FIG. 4 shows the video component 402 of the stream, the audio component 404 of the stream, the data component 406 of the stream, and an IP data test stream component 408 of the stream. Thus, a digital receiver can locate and latch to a PID containing the IP data test stream component 408 and acquire and process the IP data test stream data (in conjunction with a service level determiner) to determine a service level for the digital television signal, as will be discussed. Also, in some embodiments, the IP data test stream can have a fixed IP address allowing any digital receiver that is capable of receiving IP data streams on an MPEG-2 transport to acquire it and process it to aid in determining the service level of the digital broadcast signal. In some embodiments, the PID for the data test stream can be fixed. Further, any suitable data test stream on any type of format for a digital television broadcast signal could be used as long as it can be acquired and processed by a digital receiver.

Figure 5:
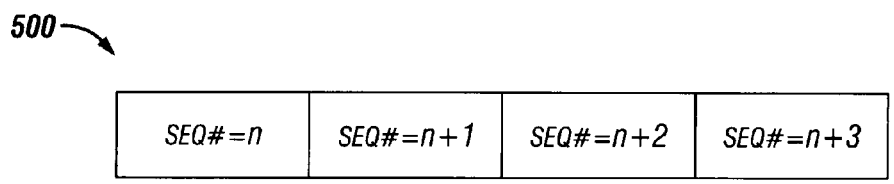
FIG. 5 illustrates an example of an IP data test stream according to one embodiment of the present invention.

FIG. 5 shows an example of an IP data test stream 500 that can be used according to one embodiment of the present invention. The IP data test stream 500 of the MPEG-2 transport stream shown in FIG. 5 can include sequentially numbered IP data packets (e.g. SEQ#=n, SEQ#=n+1, SEQ#=n+2, SEQ#=n+3, etc.) that can be used to help identify the number of packets received, as well as, the total packets lost during a given interval (e.g. time or number of packets), to determine the service level, as will be discussed. Basically, the service level is determined for the digital television broadcast signal based upon a loss of data packets from the data test stream (i.e. the error rate).

Returning to FIG. 3, the process 300 next measures the number of packets of the IP data packet test stream received over a predetermined interval (e.g. time or number of packets), (block 320). Next, the process 300 determines the IP data packet loss percentage value for the IP data packet test stream by calculating the ratio of the measured number of data packets of the IP data packet test stream received over the interval and the number of data packets of the IP data packet test stream that should have been received over the interval (block 330). This ratio yields the IP packet loss percentage value (i.e. the error rate) and corresponds to the service level of the digital television broadcast signal. The process 300 then maps the IP packet loss percentage value into a service level diagnostic (block 340). For example, if the IP data packet stream was delivered at a rate of 100 packets over a predetermined interval of one second then the service level could be easily mapped into a known service level diagnostic between 0 and 100. Accordingly, if the measured number is 50 packets, compared to the 100 packets that should have been received, then the service level diagnostic would be 50. On the other hand, if the measured number is 97 packets, then the service level diagnostic would be 97, or, if the measured number is 100 packets then the service level diagnostic would be 100, etc. Of course, it should be appreciated that many other mappings are possible.

The process 300 then displays a service level diagnostic indicator corresponding to the service level diagnostic, previously calculated (block 350). Particularly, in some embodiments, the process 300 displays the service level diagnostic indicator upon a display device, such as a television, to indicate the service level of the digital television broadcast signal.

Figure 6:
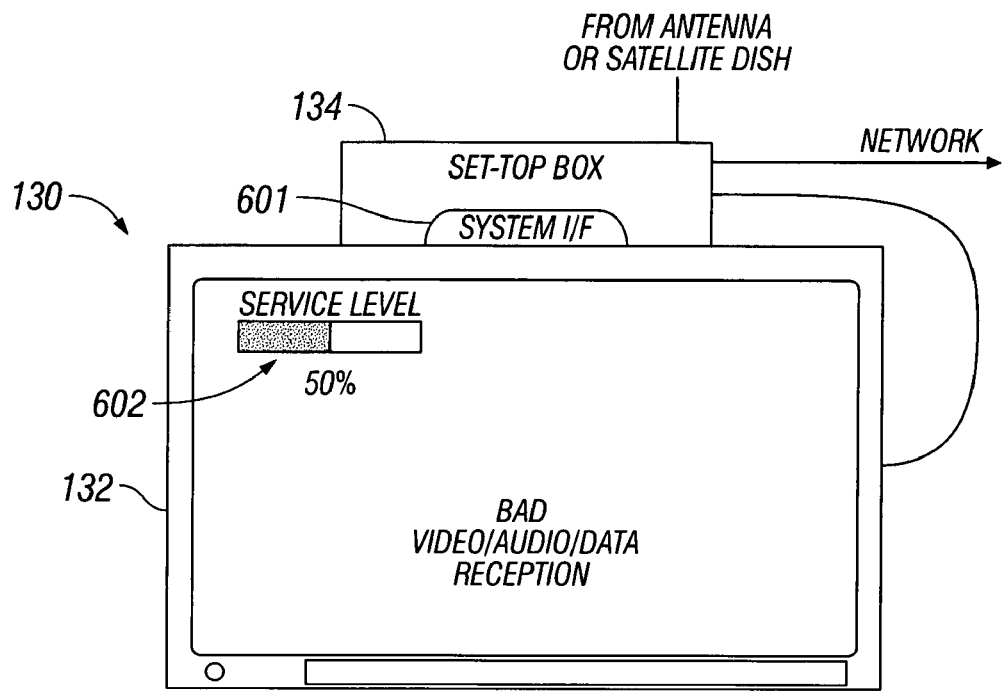
FIG. 6 illustrates a receiver device to display the service level of the incoming digital television broadcast signal according to one embodiment of the invention.

FIG. 6 shows a receiver device to display the service level of the incoming digital broadcast signal according to one embodiment of the invention. As previously discussed with reference to FIG. 1, the receiver device 130 includes a display device, typically a television 132, having a set-top box 134 to decode the digital television broadcast signal. As shown, the set-top box 134 may be receiving the digital television broadcast signal from a standard antenna (e.g. terrestrial DTV broadcast) or a satellite antenna (e.g. satellite transmission). The set-top box 134 may also include system interface (I/F) 601 and/or a remote control (not shown) to provide viewer control of the content displayed on the television. Also, the set-top box 134 may be coupled to a computer network such as the Internet. The television 132 displays the digital television broadcast signal and a service level diagnostic indicator 602. In this embodiment, the service level diagnostic indicator is shown as a rectangular bar shaped meter indicating a service level range from 0% to 100%. However, it should be appreciated, that any sort of service level diagnostic indicator that is capable of displaying a service level range can be used.

Particularly, as shown in FIG. 6, the service level diagnostic indicator reads 50% indicating that there is a 50% error rate in the receipt of the IP data packet test stream. This indicates that the television 132 is probably only receiving half of the digital television broadcast signal and is thus receiving bad video, audio, and data reception. In this case, the video picture on the television 132 would appear blocky or chunky indicating missing data packets. However, in a pure data broadcast, with no video or audio component, but for the service level diagnostic indicator 602 of the present invention, the user would have no way of knowing that they are only receiving half of the needed data.

Returning to FIG. 3, the process 300 updates the service level diagnostic indicator at predetermined intervals (e.g. a period of time or a predetermined number of packets) to allow a user to place their antenna in a best service level position to receive the "best service level" possible as indicated by the service level diagnostic indicator. The "best service level" corresponds to the digital receiver receiving the greatest amount of the IP data test stream contained within the digital television broadcast signal as possible to ensure that the user obtains the best delivery of video, audio, or other data components possible from the digital television broadcast signal.

Figure 7:
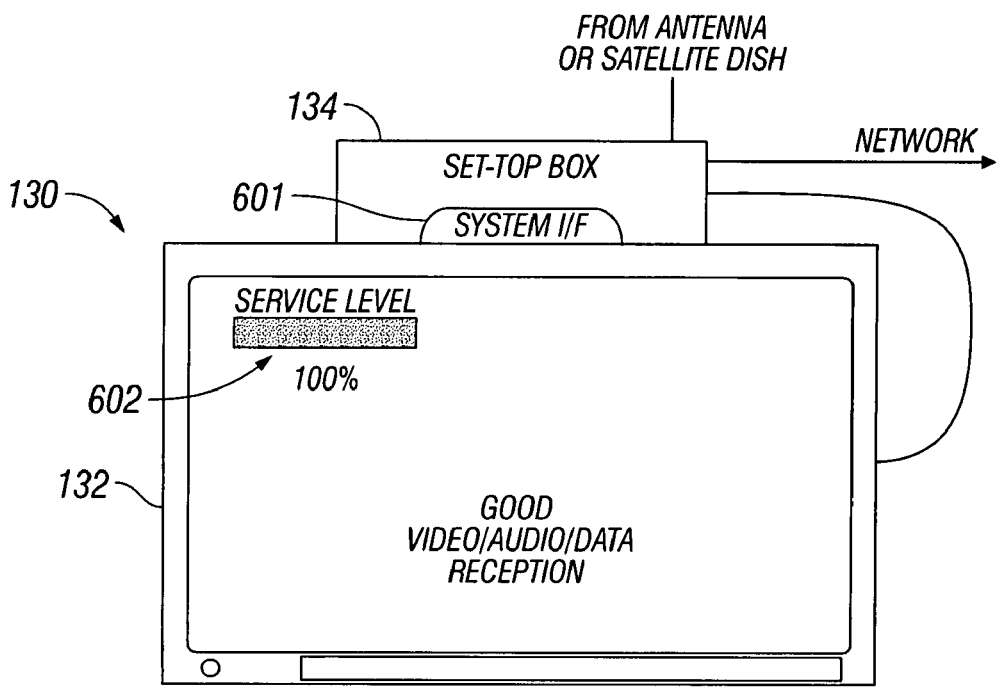
FIG. 7 illustrates the receiver device displaying a "best service level" of the incoming digital television broadcast signal according to one embodiment of the invention.

FIG. 7 illustrates the receiver device displaying a "best service level" of the incoming digital broadcast signal according to one embodiment of the invention. Thus, as shown in FIG. 7, the present invention allows a user to move their antenna until the service level diagnostic indicator 602 reaches 100% indicating to the user that they are receiving all of the data contained within the digital television broadcast signal to receive the "best service level" possible. This ensures the user that they are indeed receiving the best video picture, the best audio sound, and best data download possible.

The present invention provides an advantage in that it provides an objective measure for the user to be sure that they are indeed getting the "best service level" (i.e. that the greatest amount of data packets of the data test stream of the digital television broadcast signal are actually being received) to ensure that the user obtains the best delivery of video, audio, or other data components possible from the digital television broadcast signal. Additionally, if a viewer wants to obtain a pure data broadcast that has no visual or audio component to use for adjusting their antenna, the present invention provides an objective measure to tune their antenna to receive the "best service level" for receiving the greatest number of data packets of the pure data broadcast.

Furthermore, because the present invention directly measures the actual data packet loss (i.e. the error rate) of the data test stream a "true" service level is displayed to the user. The present invention accomplishes this with a very simple and elegant solution by directly measuring the data packet error rate of an IP data test stream. Accordingly, DTV Broadcasters can simply provide an IP data test stream in their broadcast to easily allow users to adjust their antennas to receive a digital broadcast having the best service level possible. Also, this solution enables IP data to be sent to users in all ATSC/DTV markets and could possibly accelerate the deployment of free data broadcasting to metropolitan areas of the U.S. and all over the world.

While the present invention and its various functional components been described in particular embodiments, it should be appreciated the present invention can be implemented in hardware, software, firmware, middleware or a combination thereof and utilized in systems, subsystems, components, or sub-components thereof. When implemented in software, the elements of the present invention are the instructions/code segments to perform the necessary tasks. The program or code segments can be stored in a machine readable medium, such as a processor readable medium or a computer program product. The machine-readable medium or processor-readable medium may include any medium that can store or transfer information in a form readable and executable by a machine (e.g. a processor, a computer, etc.). Examples of the machine/processor-readable medium include an electronic circuit, a semiconductor memory device, a ROM, a flash memory, an erasable programmable ROM (EPROM), a floppy diskette, a compact disk CD-ROM, an optical disk, a hard disk, etc.

In particular, in one embodiment of the present invention, the service level determiner can be generally implemented in a set-top box, to perform the desired operations, functions, and processes as previously described.

The instructions (e.g. code segments) when read and executed by the set-top box, cause the set-top box to perform the operations necessary to implement and/or use the present invention. Generally, the instructions are tangibly embodied in and/or readable from a device, such as memory, data storage devices, and/or a remote device coupled to the computer via data communication devices. The instructions may be loaded from memory, data storage devices, and/or remote devices into the memory of the set-top box for use during operations.

Thus, the service level determiner according to one embodiment of the present invention may be implemented as a method, apparatus, or machine-readable medium (e.g. a processor readable medium or a computer readable medium) using standard programming and/or engineering techniques to produce software, firmware, hardware, middleware, or any combination thereof. The term "machine readable medium" (or alternatively, "processor readable medium" or "computer readable medium") as used herein is intended to encompass a medium accessible from any machine/process/computer for reading and execution. Of course, those skilled in the art will recognize that many modifications may be made to this configuration without departing from the scope of the present invention.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
   a digital television receiver to receive a digital television broadcast signal, the digital television broadcast signal including an Internet Protocol (IP) based data test stream located on a Packet Identifier (PID) of the digital television broadcast signal having a plurality of sequentially numbered IP data packets used to determine a service level of the digital television broadcast signal being received on a channel; and
   a service level determiner to determine the service level of the digital television broadcast signal based upon a loss of IP data packets from the IP based data test stream and to cause the service level to be displayed, wherein the service level determiner measures a number of IP data packets of the IP based data test stream received by the digital television receiver over a predetermined interval and determines a data packet loss percentage value for the IP based data test stream by calculating a ratio of the measured number of IP data packets received by the digital receiver and a number of IP data packets that should have been received by the digital receiver; and a display device to display a service level diagnostic indicator based upon the loss of IP data packets from the IP based data test stream to indicate the service level of the digital television broadcast signal, the service level diagnostic indicator being updated at predetermined intervals.

2. The apparatus of claim 1, wherein the service level diagnostic indicator is a bar shaped meter indicating a service level range from 0% to 100%.

3. The apparatus of claim 1, wherein the display device is a television.

4. The apparatus of claim 1, wherein the digital television broadcast signal is communicated from a terrestrial broadcast station.

5. The apparatus of claim 1, wherein the digital television broadcast signal is communicated via a satellite network.

6. The apparatus of claim 1, wherein the service level determiner is implemented with a set-top box.

7. A method comprising:

receiving a digital television broadcast signal that includes an Internet Protocol (IP) based data test stream located on a Packet Identifier (PID) of the digital television broadcast signal having a plurality of sequentially numbered IP data packets used to determine a service level of the digital television broadcast signal being received on a channel;

determining the service level of the digital television broadcast signal based upon a loss of IP data packets from the IP based data test stream wherein determining the service level includes measuring a number of IP data packets of the IP based data test stream received over a predetermined interval and determining a data packet loss percentage value for the IP based data test stream by calculating a ratio of the measured number of IP data packets received and a number of IP data packets that should have been received; and displaying a service level diagnostic indicator based upon the loss of IP data packets from the IP based data test stream to indicate the service level of the digital television broadcast signal, the service level diagnostic indicator being updated at predetermined intervals.

8. The method of claim 7, wherein the service level diagnostic indicator is a bar shaped meter indicating a service level range from 0% to 100%.

9. The method of claim 7, wherein the display device is a television.

10. The method of claim 7, wherein the digital television broadcast signal is communicated from a terrestrial broadcast station.

11. The method of claim 7, wherein the digital television broadcast signal is communicated via a satellite network.

12. The method of claim 7, wherein determining the service level of the digital television broadcast signal and displaying the service level is implemented with a set-top box.

13. A computer-readable medium encoded with computer executable instructions being executed by a computer to perform:

receiving a digital television broadcast signal that includes an Internet Protocol (IP) based data test stream located on a Packet Identifier (PID) of the digital television broadcast signal having a plurality of sequentially numbered IP data packets used to determine a service level of the digital television broadcast signal being received on a channel;

determining the service level of the digital television broadcast signal based upon a loss of IP data packets from the IP based data test stream wherein determining the service level includes measuring a number of IP data packets of the IP based data test stream received over a predetermined interval and determining a data packet loss percentage value for the IP based data test stream by calculating a ratio of the measured number of IP data packets received and a number of IP data packets that should have been received; and displaying a service level diagnostic indicator based upon the loss of IP data packets from the IP based data test stream to indicate the service level of the digital television broadcast signal, the service level diagnostic indicator being updated at predetermined intervals.

14. The computer-readable medium of claim 13, wherein the service level diagnostic indicator is a bar shaped meter indicating a service level range from 0% to 100%.

15. The computer-readable medium of claim 13, wherein the display device is a television.

16. The computer-readable medium of claim 13, wherein the digital television broadcast signal is communicated from a terrestrial broadcast station.

17. The computer-readable medium of claim 13, wherein the digital television broadcast signal is communicated via a satellite network.

18. The computer-readable medium of claim 13, wherein determining the service level of the digital television broadcast signal and displaying the service level is implemented with a set-top box.

* * * * *